United States Patent
Chakra et al.

(10) Patent No.: US 11,496,602 B2
(45) Date of Patent: Nov. 8, 2022

(54) FENCE COMPUTING

(71) Applicant: International Business Machines Corporation, Armonk, NY (US)

(72) Inventors: Al Chakra, Apex, NC (US); Yuk L. Chan, Rochester, NY (US); Jonathan Dunne, Dungarvan (IE); Liam S. Harpur, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 518 days.

(21) Appl. No.: 16/018,150

(22) Filed: Jun. 26, 2018

(65) Prior Publication Data
US 2019/0394301 A1    Dec. 26, 2019

(51) Int. Cl.
*H04L 67/62* (2022.01)
*H04L 67/306* (2022.01)
*H04L 67/1097* (2022.01)
*H04L 67/61* (2022.01)

(52) U.S. Cl.
CPC .......... *H04L 67/62* (2022.05); *H04L 67/1097* (2013.01); *H04L 67/306* (2013.01); *H04L 67/61* (2022.05)

(58) Field of Classification Search
CPC . H04L 67/325; H04L 67/1097; H04L 67/306; H04L 67/322; H04L 67/2833
See application file for complete search history.

(56) References Cited

U.S. PATENT DOCUMENTS

| | | | |
|---|---|---|---|
| 9,413,809 B1* | 8/2016 | Morse | H04W 4/14 |
| 9,483,697 B2 | 11/2016 | Svendsen | |
| 9,544,382 B2 | 1/2017 | Bosworth et al. | |
| 9,898,172 B2 | 2/2018 | Hu et al. | |
| 9,923,981 B2 | 3/2018 | McDonald et al. | |
| 9,953,091 B1 | 4/2018 | Gueye | |
| 10,009,398 B2 | 6/2018 | Tsarkova | |
| 10,623,997 B2* | 4/2020 | Fersman | H04L 67/62 |
| 2009/0313546 A1* | 12/2009 | Katpelly | H04N 21/25891 715/723 |

(Continued)

OTHER PUBLICATIONS

Fischer et al.; "Real-Time Visual Analytics For Event Data Streams", SAC'12 27th Annual ACM Symposium On Applied Computing, Mar. 26-30, 2012, pp. 801-806.

(Continued)

*Primary Examiner* — Dhairya A Patel
*Assistant Examiner* — Eui H Kim
(74) *Attorney, Agent, or Firm* — Cantor Colburn LLP; Teddi Maranzano (57) ABSTRACT

Aspects include identifying an event associated with extraction and transmission of a dataset from a data center over a network to one or more network servers and identifying a plurality of tasks associated with a plurality of users and the event. A predicted availability time of the dataset is determined for the one or more network servers based on data extraction performance from a backend data storage system of the data center. Processing is clustered of a plurality of posting requests of two or more of the users through the one or more network servers to align with the predicted availability time of the dataset.

12 Claims, 7 Drawing Sheets

(56) References Cited

U.S. PATENT DOCUMENTS

| | | | |
|---|---|---|---|
| 2013/0018896 A1* | 1/2013 | Fleischman | G06F 16/435 |
| | | | 707/748 |
| 2014/0229578 A1* | 8/2014 | Chu | H04L 67/1097 |
| | | | 709/219 |
| 2014/0244742 A1* | 8/2014 | Yu | G06Q 30/02 |
| | | | 709/204 |
| 2015/0006711 A1* | 1/2015 | Schaad | H04L 41/147 |
| | | | 709/224 |
| 2015/0237464 A1* | 8/2015 | Shumaker | H04L 51/52 |
| | | | 709/204 |
| 2016/0232241 A1 | 8/2016 | Stoyanov et al. | |
| 2017/0012913 A1 | 1/2017 | Lohani | |
| 2017/0064020 A1 | 3/2017 | Obukhov et al. | |
| 2017/0085659 A1 | 3/2017 | Bosworth et al. | |
| 2017/0243140 A1* | 8/2017 | Achin | G06Q 10/06 |
| 2017/0256040 A1* | 9/2017 | Grau | G06T 3/40 |
| 2018/0018327 A1 | 1/2018 | Fleischman et al. | |
| 2018/0020066 A1 | 1/2018 | Tang et al. | |
| 2018/0124072 A1* | 5/2018 | Hamdi | G06F 11/3428 |
| 2019/0034976 A1* | 1/2019 | Hamedi | G06Q 30/0243 |

OTHER PUBLICATIONS

Li et al.; "On Social Event Organization", KDD'14 20th ACM SIGKDD International Conference On Knowledge Discovery And Data Mining, Aug. 24-27, 2014, pp. 1206-1215.

Spasojevic et al.; "When-To-Post On Social Networks", KDD'15 21st ACM SIGKDD International Conference On, Aug. 10-13, 2015, pp. 2127-2136.

Wang et al.; "Social Event Detection With Interaction Graph Modeling", MM'12 20th ACM International Conference On Multimedia, Oct. 29-Nov. 2, 2012, pp. 865-868.

* cited by examiner

| User ID | Task ID | Description |
|---------|---------|-------------|
| User1 | 1 | Refresh feedX |
| User1 | 2 | Stream data fileY |
| User3 | 3 | Refresh feedX |
| User4 | 4 | Refresh feedX |

| User ID | Task ID | Description |
|---------|---------|-------------|
| User1 | 1 | Refresh feedX User1, User3, User4 |
| User1 | 2 | Stream data fileY |

FENCE COMPUTING

BACKGROUND

The present invention generally relates to computer systems and, more specifically, to data center processing optimization.

Large amounts of data can be stored in data centers to support requests from multiple networked systems and multiple users. Data center processing can include balancing responsiveness to data requests and management of storage resources within the data center. Data centers typically store some data in backend storage systems that may have associated access delays such that the data requests cannot be immediately fulfilled in real-time.

SUMMARY

According to one or more embodiments of the present invention, a computer-implemented method includes identifying an event associated with extraction and transmission of a dataset from a data center over a network to one or more network servers and identifying a plurality of tasks associated with a plurality of users and the event. A predicted availability time of the dataset is determined for the one or more network servers based on data extraction performance from a backend data storage system of the data center. Processing is clustered of a plurality of posting requests of two or more of the users through the one or more network servers to align with the predicted availability time of the dataset.

Other embodiments of the invention implement the features of the above-described method in a computer system and in a computer program product.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

One or more embodiments of the present invention can be implemented on cloud computing. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
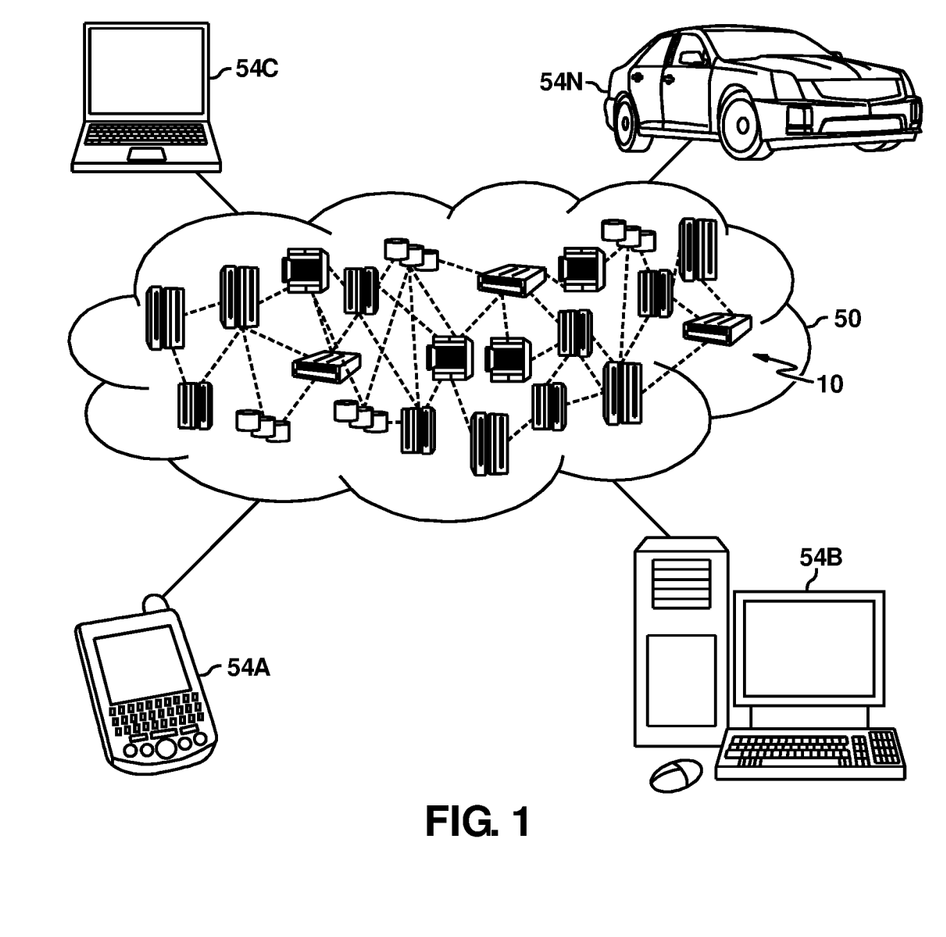
FIG. 1 depicts a cloud computing environment according to one or more embodiments of the present invention.

Referring now to FIG. 1, illustrative cloud computing environment 50 is illustrated. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
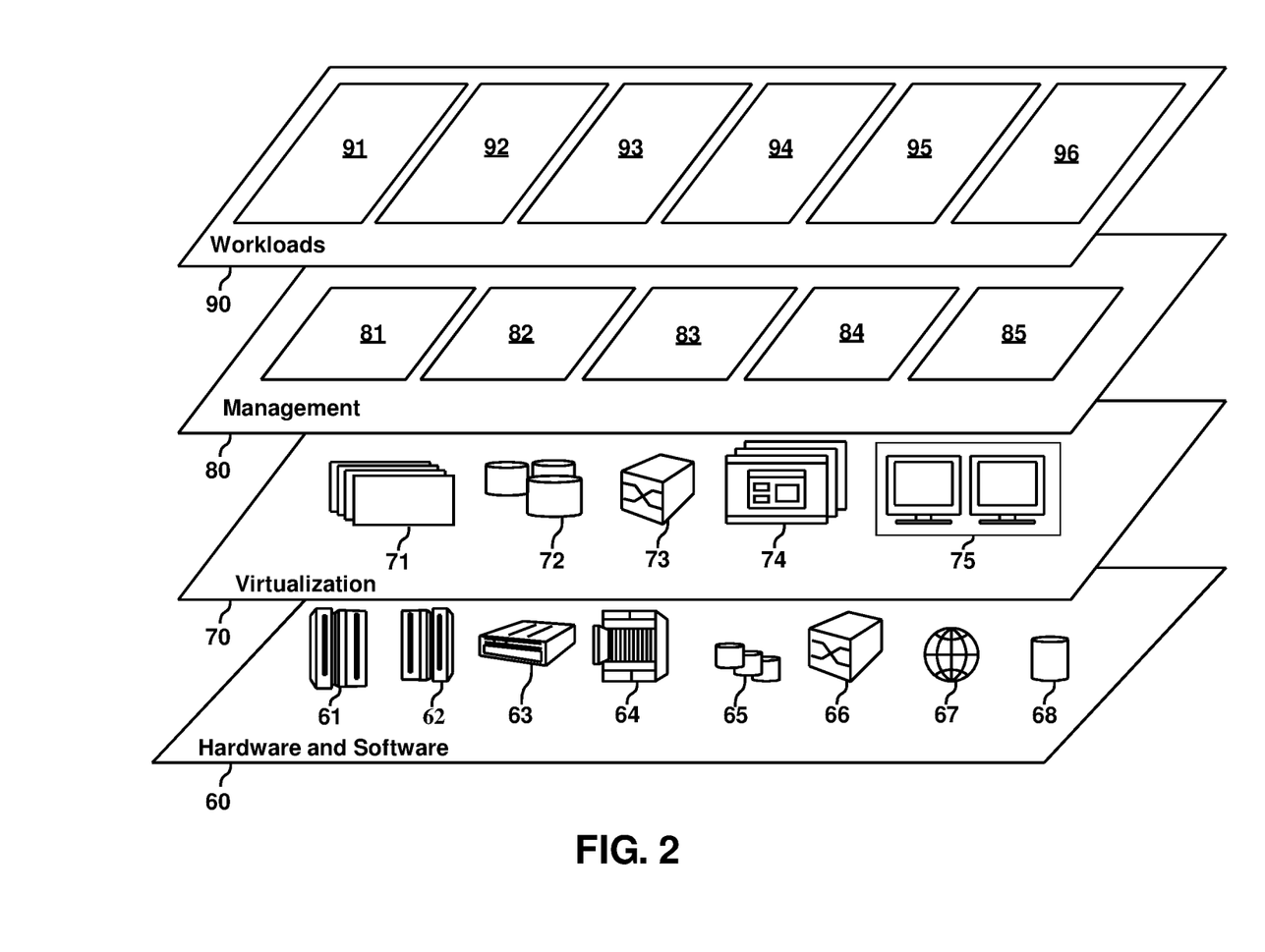
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As illustrated, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and fence computing support 96. The fence computing support 96 can include functions of orchestrating backend data load operations of a data center associated with multiple user tasks to align data loading with a common event to be processed together to optimize data center processing and further coordinate augmentation of user posting requests based on the backend data as further described herein.

Figure 3:
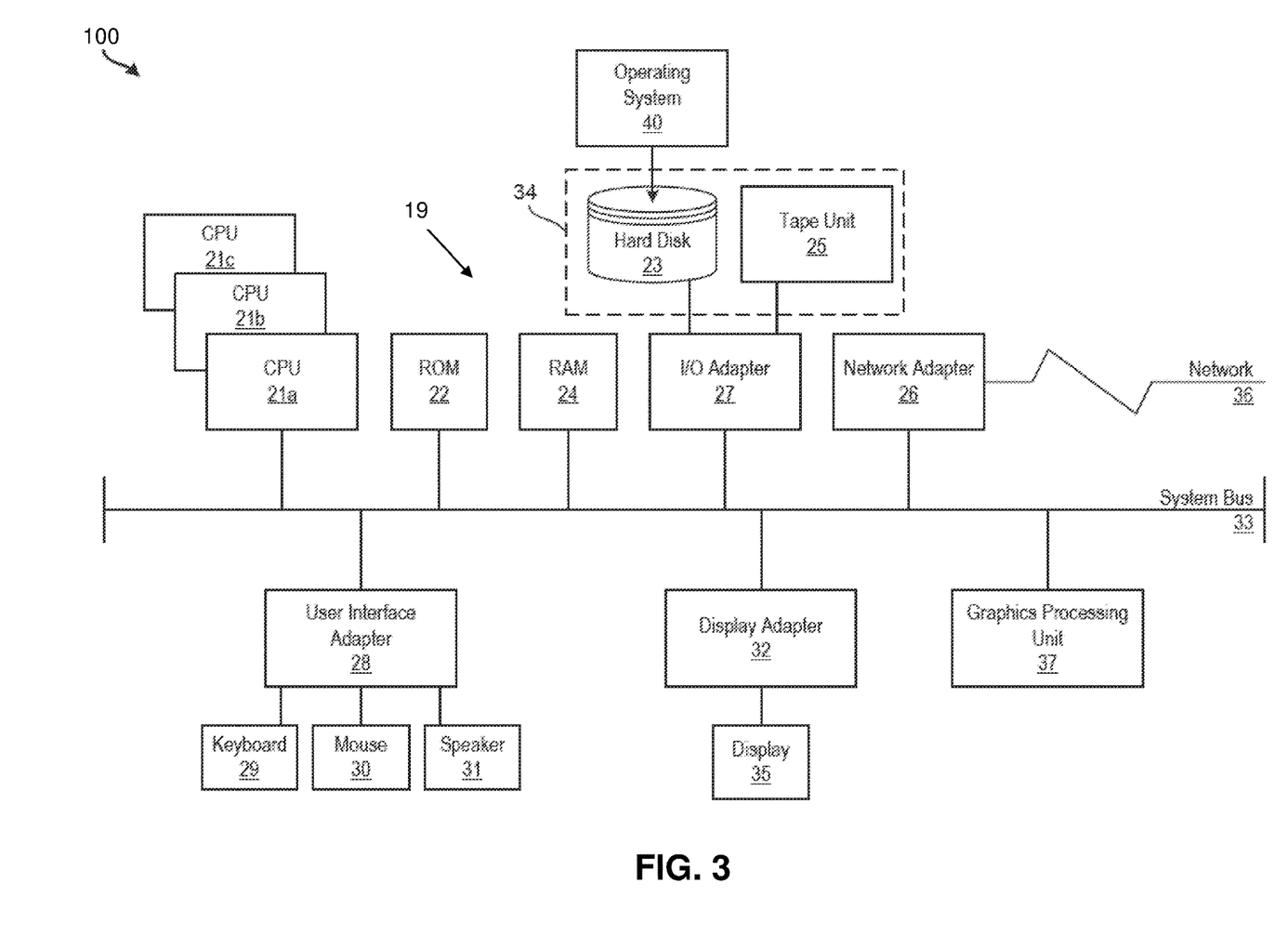
FIG. 3 depicts a block diagram of a processing system for implementing embodiments of the present invention.

It is understood that one or more embodiments of the present invention are capable of being implemented in conjunction with any other type of computing environment now known or later developed. For example, FIG. 3 depicts a block diagram of a processing system 100 for implementing the techniques described herein. The processing system 100 is an example of a computing node 10 of FIG. 1. In examples, processing system 100 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 100.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage drive 25 are collectively referred to herein as mass storage 34. Operating system 40 for execution on processing system 100 can be stored in mass storage 34. The ROM 22, RAM 24, and mass storage 34 are examples of memory 19 of the processing system 100. A network adapter 26 interconnects system bus 33 with an outside network 36 enabling the processing system 100 to communicate with other such systems.

A display (e.g., a display monitor) 35 is connected to system bus 33 by display adapter 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 100 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 100 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 100.

Turning now to an overview of technologies relevant to aspects of the disclosed system, due to bandwidth, storage, processing resource allocation, and social/cognitive reasons, it may be impractical to have a sufficient quantity of background data preloaded to support real-time augmentation of a user post request through a social networking system with social/cognitive enhancements in a cloud environment (e.g., the cloud computing environment 50 described in FIG. 1). For example, users attending or observing an event, such as a baseball game, may desire to submit a post as a posting request to one or more social networking systems. Users may also desire that the contents of their posting requests be enhanced with better wording, auto-corrections, enhanced sharing, improved clarity, and supplemental information as part of the posting process. Wording, auto-corrections, and clarity may be enhanced through text analytics performed by the social networking system or through third-party/cloud services. Enhanced sharing and inclusion of supplemental information can involve social and cognitive enhancements that may require analysis of posting requests of other users and/or analysis of related data by a cognitive system which may be available as a third-party/cloud service. For a cognitive system to provide meaningful insights, a data center may be accessed to load a sufficient quantity of background data from a backend data storage system. As the data loading process may take an extended period of time, delays can result. At events where multiple users are likely to attempt to make posting requests that use the background data, data center processing burdens may increase if related datasets are extracted from the backend data storage system at different times, which may result in cycles of dataset extraction, purging of extracted datasets, and subsequent dataset extraction within a relatively short window of time (e.g., over several hours).

In summary, existing coordination between user posting requests through social networking systems and resulting dataset requests from a data center to support or enhance the posts can be lacking, resulting in an inefficient use of data center resources, increased network traffic, and slow response times to posting requests. Effects can be further magnified with a large number of users generating posts associated with the same event, where many similar operations are separately initiated by users without coordination. Further, social networking systems may not efficiently handle the interactions due to limited visibility to specific users. For example, one group of users may post through a single social networking system, and a second group of users may post through a different social networking system while both social networking systems trigger dataset loads from the same data center.

Turning now to an overview of the aspects of the invention, one or more embodiments of the invention address the above-described shortcomings of the prior art by clustering (e.g., grouping) a plurality of posting requests of users through one or more network servers to align with a predicted availability time of the dataset from a data center. Embodiments can predict an availability time of a dataset when a sufficient amount of background data associated with an event is likely to be extracted from backend data storage and made available to support social-cognitive enhancements of user posts through one or more social networking systems. A task aggregator can group queued tasks from multiple users associated with an event.

The above-described aspects of the invention address the shortcomings of the prior art by assigning a virtual location identifier to link backend resource access, user data, and predicted/actual posts by the users. Embodiments can provide posting suggestions to indicate when datasets from the backend data storage will likely be available to enhance user posts. Technical effects and benefits can include reducing network bandwidth demands, reducing data center demand for similar datasets at similar points in time, and selectively accelerating the performance of data extraction and transmission for specific topics.

Figure 4:
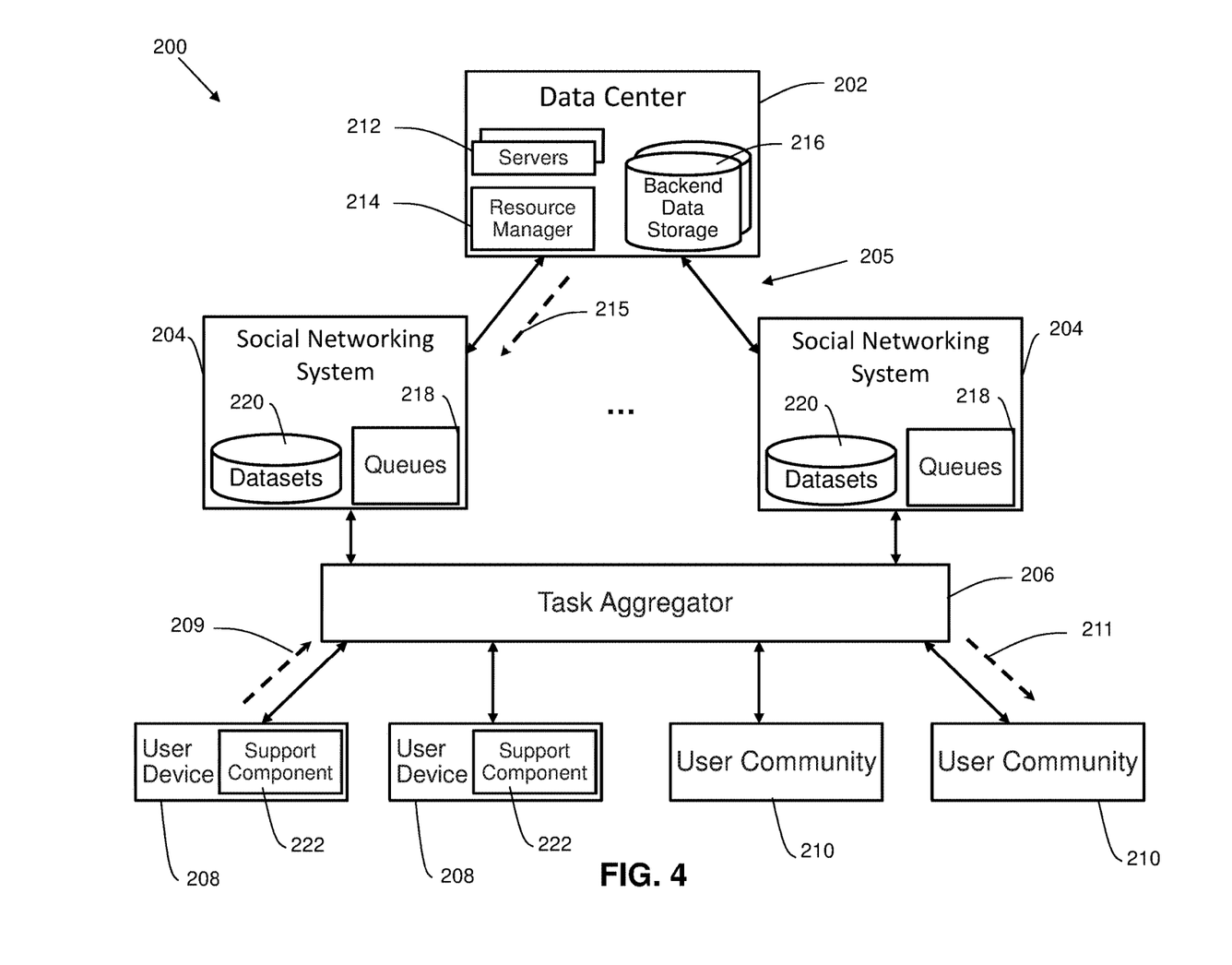
FIG. 4 depicts a block diagram of a system according to one or more embodiments of the present invention.

Turning now to a more detailed description of aspects of the present invention, FIG. 4 depicts a block diagram of a system 200 according to one or more embodiments of the present invention. The system 200 can include a data center 202, a plurality of social networking systems 204, and a task aggregator 206 operable to communicate over a network 205, such as network 36 of FIG. 3. The task aggregator 206 can interface with the social networking systems 204, a plurality of user devices 208, and one or more user communities 210. The user devices 208 can be any type of computer system, such as the processing system 100 of FIG. 3. The user communities 210 can be organized groups of the user devices 208 that may operate and share data collectively. The task aggregator 206 may be a cloud service, such as a component of fence computing support 96 of FIG. 2. The social networking systems 204 (also referred to as network servers) can be any type of computing system that receives posting requests 209 and distributes resulting posts 211 to the user devices 208 and/or user communities 210. The posts 211 can include status information, images, videos, text, emoji, tags, audio clips, location information, and other such data.

In embodiments, the social networking systems 204 interfaces with the data center 202 to augment or enhance posting requests 209 from users of the user devices 208 and/or the user communities 210. The data center 202 can include a plurality of servers 212, a resource manager 214, a backend data storage system 216, and other such elements. The resource manager 214 can execute on one or more of the servers 212 to manage reading data from and writing data to the backend data storage system 216 in addition to communicating with the social networking systems 204 and/or user devices 208 and user communities 210. The servers 212 can be embodiments of the processing system 100 of FIG. 1. The backend data storage system 216 can provide large-scale data storage/warehousing with selected datasets extracted as needed and transferred out of the data center 202. As datasets 215 are extracted from the backend data storage system 216, the datasets 215 may be readily accessible for a period of time until other data extraction requests take priority and associated datasets 215 are made available in place of previously extracted datasets 215. The social networking systems 204 can store sequences of user requests and results in queues 218 and local copies of associated data in datasets 220. As posting requests 209 are received from a support component 222 of the user devices 208, the posting requests 209 can be sequentially stored in the queues 218. Where the support component 222 requests or indicates a need for supplemental data from the resource manager 214, the resource manager 214 can load one or more datasets 215 from the backend data storage system 216 and/or can provide data from the backend data storage system 216 to another service (e.g., such as a cognitive system) to further enhance the datasets 215, which can be stored as datasets 220 at the social networking systems 204.

In some embodiments, the task aggregator 206 combines tasks associated with a common event from the multiple users of the user devices 208 and/or the user communities 210. Where the task aggregator 206 is implemented separately from the social networking systems 204, tasks that are associated with different instances of the social networking systems 204 can be aggregated that would otherwise result in redundant or similar requests from the data center 202. This aggregation may be referred to as cloud aggregation. Further examples are provided with respect to FIGS. 5 and 6.

Figure 5:
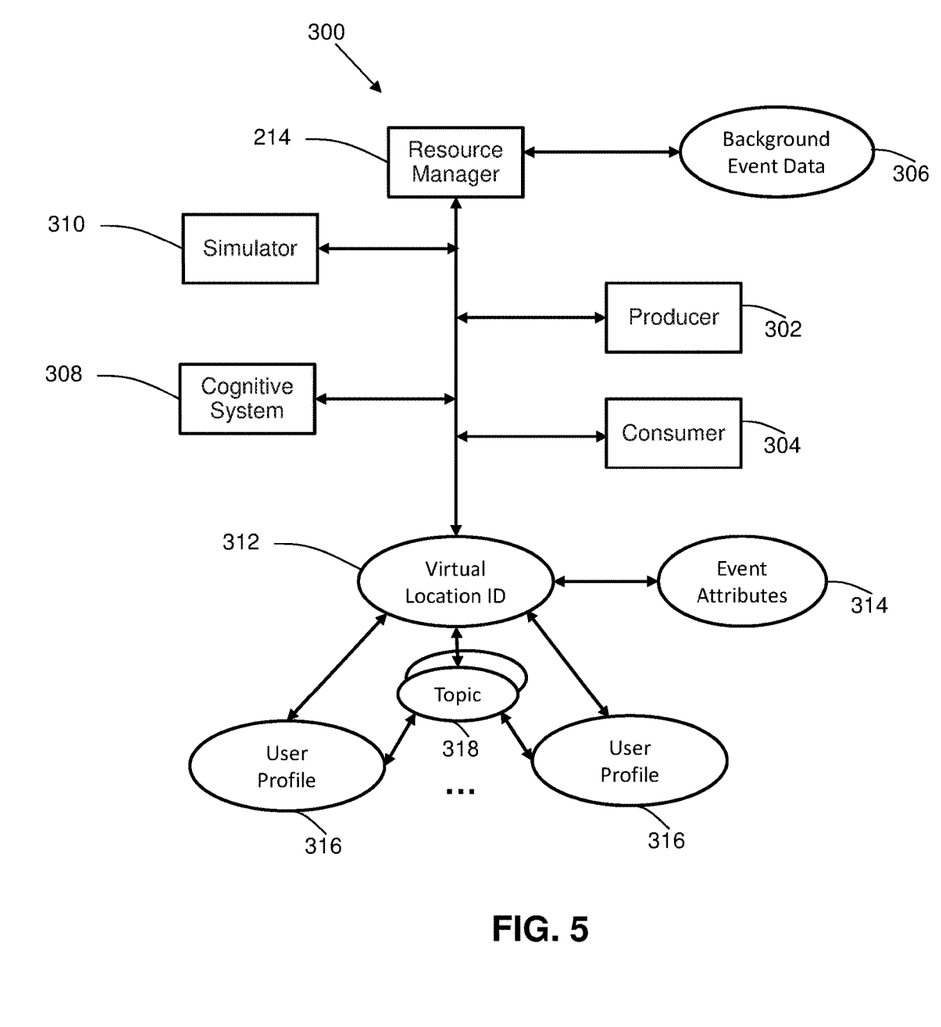
FIG. 5 depicts a block diagram of data processing interactions according to one or more embodiments of the present invention.

Data processing interactions 300 of FIG. 5 depict an example of interactions between a producer 302 and a consumer 304 to extract background event data 306 through the resource manager 214 for use or further analysis by another system, such as a cognitive system 308 or simulator 310. The producer 302 is a component, system, or service that establishes one or more events that can be aggregated by the task aggregator 206. For example, one of the support components 222 of FIG. 4 can be the producer 302 as a generator of tasks that may be combined with other related tasks. The consumer 304 can be the task aggregator 206 of FIG. 4, which may access one or more instances of the queues 218 of FIG. 4 to determine whether tasks can be aggregated to increase operational efficiency for the data center 202 of FIG. 4 as part of the fence computing support 96 of FIG. 2.

As an example, consider a two user case, where users A and B are observing the same baseball game (either in-person or through a broadcast), and both users A and B intend to post feedback about the baseball game through separate instances of user devices 208 on at least one of the social networking systems 204 of FIG. 4. Posting requests 209 are buffered in queues 218, where the posting request 209 from user A arrives first, followed by other posting requests 209 from user X, user Y and user Z, and eventually, user B's posting request 209 arrives. The users can optionally use hashtags or add to an existing thread to give a post context.

In embodiments, the social networking system 204 may desire to load the background event data 306 associated with the baseball game into memory as datasets 220, analyze the background event data 306, and analyze the posting request 209 of user A with respect to the background event data 306. The fence computing support 96 of FIG. 2 can create a virtual location identifier 312, for instance, called "Baseball_Location_4538" with event attributes 314 loaded, such as "Event_Name, involved_parties, event_type, access_control, visibility, event_awareness, event_scope, event_duration". The virtual location identifier 312, called "Baseball_Location_4538", can be linked to the resource manager 214, which can maintain the priority of the event and works to queue/orchestrate the background event data 306 and user profile 316 data associated with the users. The virtual location identifier 312 can map to a physical location, such as a baseball stadium. Users may be present at the physical location associated with the virtual location identifier 312, for instance, as confirmed through global positioning information of a user device 208 or may be observing (e.g., watching or listening to) the event while at a different physical location.

The fence computing support 96 of FIG. 2 can ascertain the likelihood of user X, user Y and user Z making a post 211 related to the event and when the posting request 209 is predicted to take place. The predictions can be accomplished using existing techniques that take variables, such as "topic_name, location, frequency_of_post, interest_priority, current_activity, previous_10_posts_tone", in order to ascertain the likelihood and timing of a posting request 209. The virtual location identifier 312 and user profiles 316 can also be linked based on one or more topics 318. The user profiles 316 can include user attributes and activity history. From this analysis, the likely content of the post 211 may also be understood as: analyze likely post X (or actual post X) @ "Baseball_Location_4538", analyze likely post Y (or actual post Y) @ "Baseball_Location_4538", and analyze likely post Z (or actual post Z) @ "Baseball_Location_4538". In some embodiments, fence computing support 96 can use the simulator 310 to infer the type of data processing needed for a particular output. Depending on the outputs desired, a queuing model can be implemented to prioritize specific types of data for processing at the servers 212 of FIG. 4. The simulator 310 can use, for instance, Markov chain Monte Carlo (MCMC) methods to support the simulation.

In embodiments, the resource manager 214 can determine how long it will likely take to extract the background event data 306 from the backend data storage system 216, for instance, based on a current allocation of resources, such as utilization of the servers 212 and communication bandwidth dedicated to the data extraction task along with an amount of data to be extracted. The resulting timing information can be conveyed to the support components 222 of FIG. 4 to orchestrate or influence the transmission of data. In some embodiments, the fence computing support 96 of FIG. 2 manages informing an end user of suggested actions through the support component 222 to delay posting requests 209 or make immediate posting requests 209 based on whether the predicted availability time of a dataset 215 from the background event data 306 is a future time or the dataset 215 is presently extracted and ready for use. As one example, a message to an end user may be, " . . . please wait 12 minutes before posting the proposed post because the back end system will likely have more suggestions to modify the content Y/N?" The cognitive system 308 may automatically modify the content of a posting request 209, by adding more background text, adding hash tags, changing grammar, changing focus, adding a photo, changing recipients, or other such modifications to enhance a resulting post 211. As another example, a message may be, " . . . you will likely post about this baseball event, now is the optimal time to do that because the backend system fully researched the event . . . but in 20 minutes that advantage will be lost. Post now? Y/N".

At a specific point in time (depending on currently deployed workload policy), the data center 202 can optimally handle a specific load, e.g., the data center 202 is optimized for IO on 34% of the servers 212 and optimized for social processing on 10% of the servers 212. The imposed constraints can be harnessed such that a batch of tasks to be processed is grouped to match the desired allocation of 34% IO tasks and 10% social tasks.

In embodiments, the fence computing support 96 of FIG. 2 can enable optimization of workloads from users of the social networking systems 204 of FIG. 4 to the data center 202, where support components 222 initiate tasks from end users that can be aggregated by the task aggregator 206. The fence computing support 96 of FIG. 2 can determine when to send social content from a user device 208 or user community 210 (e.g., wait 12 minutes before actually posting a proposed post because the cognitive system 308 will likely have more suggestions to modify the content based on extraction of the background event data 306). Delay suggestions can be managed through the resource manager 214. However, the resource manager 214 may not be directly involved in suggesting delays depending on backend constraints. The fence computing support 96 of FIG. 2 can make decisions about which social data/tasks to reduce/increase on the edge (e.g., promote certain types of tasks from specific users for a certain topic 318 at user device 208 or user community 210). Interest identified in certain/specific topics 318 can result in accelerating data extraction and processing for specific topics 318 and reducing others. The fence computing support 96 of FIG. 2 may also determine which data/tasks are to be bundled together in the data center 202 to speed up processing. Adjustments can be made in the allocation of tasks to the servers 212 and adjustments can be made to the volume of data sent such that it satisfies a ratio mix of data for topics 318.

Aggregation can be done by the task aggregator 206 at the time tasks are available for initial workload ingestion. Task aggregation that combines tasks can contribute to performance gains, such as, a reduced number of parses, a reduced number of serializations, a reduced number of commits (reduced IO), and/or an increased processing efficiency. Aggregation can enhance performance where two separate events are written to a queue, each relating to singular and separate tasks and each one is consumed separately and processed in isolation. In embodiments, the producer 302 of tasks can establish that one or more tasks (e.g., based on data type, size, and time proximity) can be aggregated with others already raised in the current scope. Aggregation can combine multiple tasks into one larger task referencing multiple tasks. The tasks bundled together for processing can have a similar data type. Aggregation can happen by applying a similar type of annotation for the data to be understood as one task.

Figure 6:
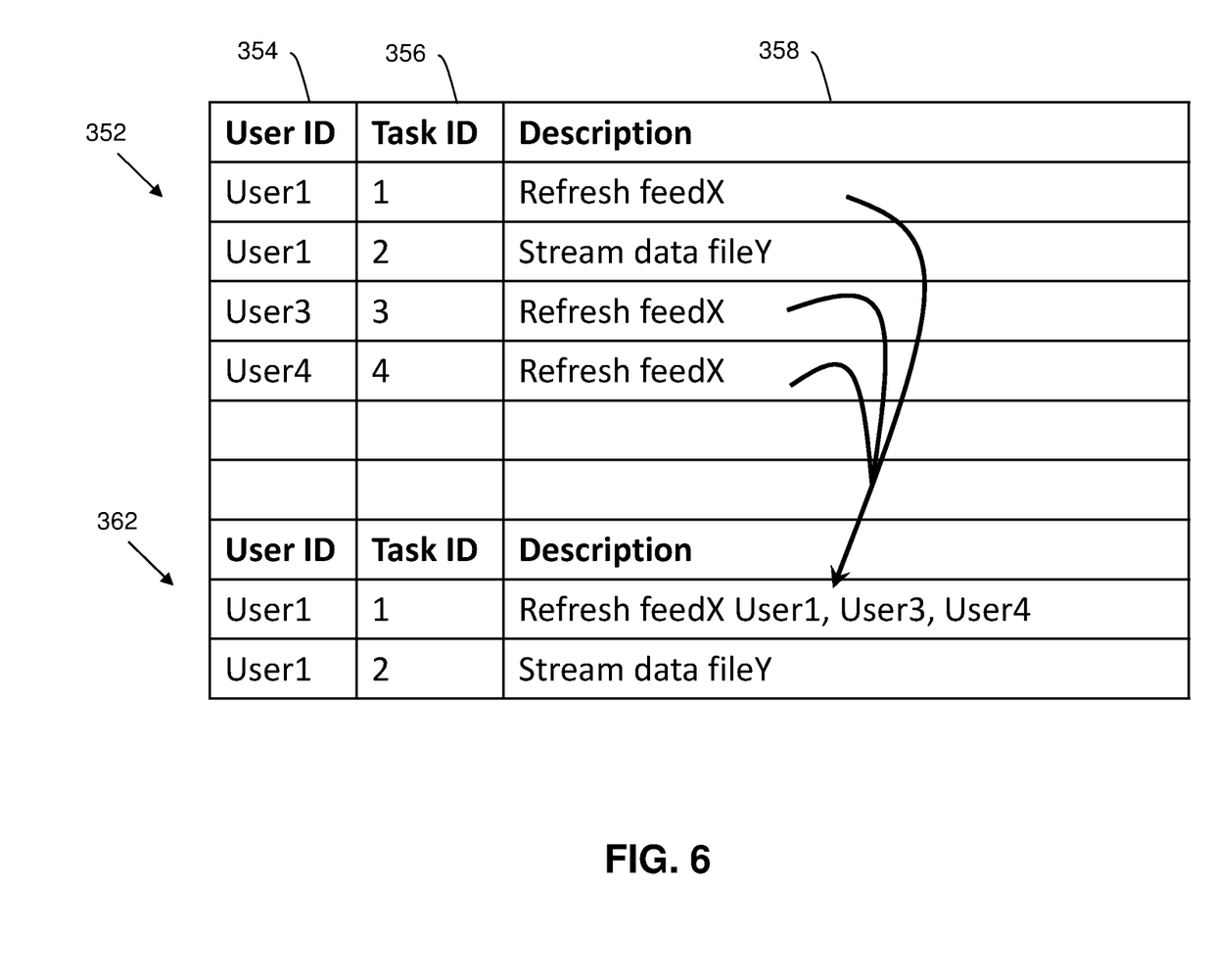
FIG. 6 depicts an aggregation process according to one or more embodiments of the present invention.

An example of aggregation of events is shown in FIG. 6 to facilitate decisions at the consumer 304 that can allow the consumer 304, while processing a task, to locate other tasks that can be processed together such that processing efficiencies occur. For instance, a sequence of tasks 352 can be examined as queued for a user identifier 354, task identifier 356, and description 358. To reduce redundant and time delayed repetition of processing and data accesses of the backend data storage system 216, tasks 1, 3, and 4 in the sequence of tasks 352 can be aggregated into task 1 of a modified sequence of tasks 362. Since tasks 1 and 2 are both for user1, the order of operations with respect to user1 can be maintained while combining tasks 3 and 4 of the sequence of tasks 352 into task 1. A task that is aggregated and impacts multiple users may be promoted or given higher priority by the resource manager 214 upon processing. FIG. 6 represents one example and many variations of task aggregation are contemplated.

With continued reference to FIGS. 1-5, the producer 302 can determine and publish with a task, metadata that describes a workload affinity coefficient that relates to other tasks, for instance, an association to the virtual location identifier 312. The producer 302 can record information used for analytics, such as workload coefficient relationships and frequencies for user profiles 316 and topics 318. The consumer 304 can read a list of tasks from the queues 218 or an alternate structure. The consumer 304 can read additional tasks that can be processed more efficiently in combination following certain criteria of various task matching techniques. One technique is an exact match where searching is performed for more tasks that can aggregate with the current event associated with the virtual location identifier 312, e.g., "Baseball_Location_4538". Searching can be performed by looking for tasks with a matching (workload) event coefficient. After retrieving such tasks, the consumer 304 can confirm that the tasks match for aggregation. This may occur where separate independent threads produce the tasks in isolation without the benefit of being able to aggregate tasks at the production stage. Alternate techniques for matching can include the use of patterns of behavior. One example pattern looks at likely subsequent outcomes for a current task and looks for other tasks that are most likely to yield the same outcomes. Another example pattern can look for other events that are likely to produce tasks that will aggregate with the current task that can be retrieved and processed before the current task.

Embodiments can facilitate decisions at the consumer 304 to allow it, while processing a task, to locate other tasks that can be processed together such that processing efficiencies occur. The analysis of the coefficient relationship information can determine which relationships are likely to produce the optimal results. The consumer 304 can record further details relating to the success rate when following aggregation patterns, which can be fed into the analysis.

Figure 7:
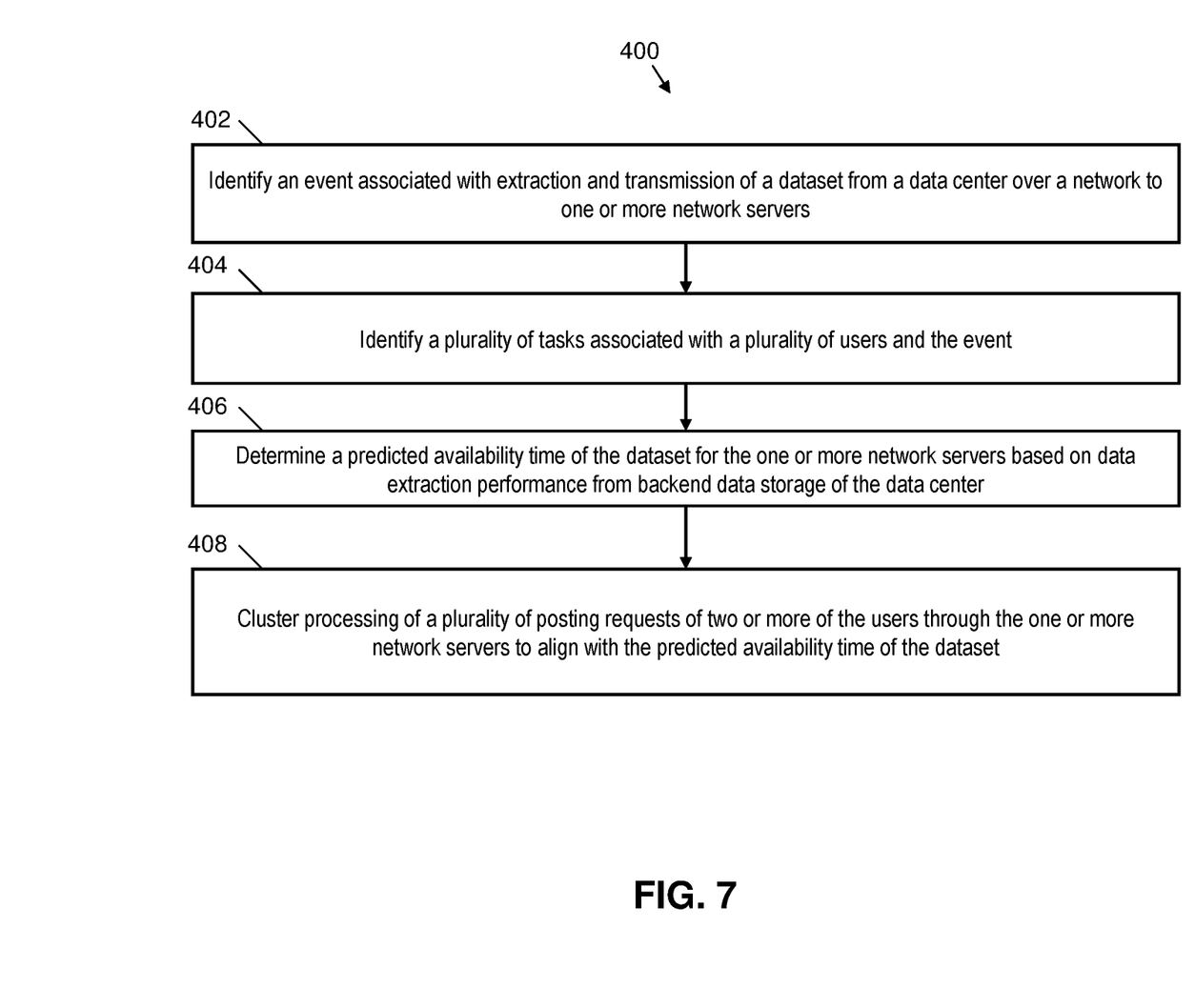
FIG. 7 depicts a flow diagram of a method according to one or more embodiments of the present invention.

FIG. 7 depicts a flow diagram of a method 400 according to one or more embodiments. The method 400 is described with respect to FIGS. 1-7 and may include additional steps and/or be further subdivided or combined. For purposes of explanation, the method 400 is described in greater detail in reference to the examples of FIGS. 2-5 but is applicable to other configurations.

At block 402, fence computing support 96 can identify an event associated with extraction and transmission of a dataset 215 from a data center 202 over a network 205 to one or more network servers, such as the social networking systems 204. At block 404, fence computing support 96 can identify a plurality of tasks associated with a plurality of users and the event. The tasks can be identified from a sequence of tasks 352 with user identifiers 354 associated one or more user devices 208 and/or user communities 210.

At block 406, fence computing support 96 can determine a predicted availability time of the dataset 215 for the one or more network servers based on data extraction performance from a backend data storage system 216 of the data center 202, for example, based on information provided by the resource manager 214.

At block 408, fence computing support 96 can cluster processing of a plurality of posting requests 209 of two or more of the users through the one or more network servers to align with the predicted availability time of the dataset 215 using, for example, the task aggregator 206. Clustered processing can be performed by combining tasks that use the same dataset 215 or a subset of the dataset 215, for instance.

In some embodiments, fence computing support 96 can create a virtual location identifier 312 associated with the event and a plurality of event attributes 314. The virtual location identifier 312 can be linked to a resource manager 214 of the data center 202. The fence computing support 96 may also link the virtual location identifier 312 to user profile 316 data of the users. Linking establishes relationships and tracking between attributes and tasks to support task aggregation. The fence computing support 96 may also determine a likelihood and a predicted timing of the users making a post 211 to the one or more network servers based on the user profile 316 data and the event attributes 314.

The fence computing support 96 can send a posting delay request based on determining that at least one of the users is likely to make a post 211 prior to the predicted availability time of the dataset 215. The fence computing support 96 may send a posting suggestion based on determining that at least one of the users is likely to make the post 211 after the predicted availability time of the dataset 215.

The fence computing support 96 can increase a priority of data extraction from the backend data storage system 216 of the data center 202 for a first topic 318 associated with the event, and decrease the priority of data extraction from the backend data storage system 216 of the data center 202 for a second topic 318 unassociated with the event.

The fence computing support 96 can provide the dataset 215 to a cognitive system 308 to augment at least one post 211 associated with the posting requests 209 to incorporate one or more additional features based on the dataset 215.

The task aggregator 206 can aggregate two or more of the tasks based on one or more of: a data type, a size, and a time proximity. Aggregation can also include searching for one or more other tasks likely to have a same outcome as the tasks, and searching for one or more tasks likely to produce results that will aggregate with a current task prior to processing the current task.

The fence computing support 96 can infer a type of data processing for prioritizing the tasks based on a simulator 310 operable to perform a queuing model. Allocation of one or more resources of the data center 202 can be performed based on the type of data processing.

Additional processes also can be included, and it should be understood that the processes depicted herein represent illustrations and that other processes can be added or existing processes can be removed, modified, or rearranged without departing from the scope and spirit of one or more embodiments of the present invention.

The present techniques can be implemented as a system, a method, and/or a computer program product. The computer program product can include a computer readable storage medium (or media) having computer readable program instructions thereon for causing a processor to carry out aspects of one or more embodiments of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of one or more embodiments of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some examples, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments of the present invention.

Aspects of one or more embodiments of the present invention are described herein with reference to flowchart illustrations and/or block diagrams of methods, apparatus (systems), and computer program products according to one or more embodiments of the present invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of one or more embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method comprising:
    identifying, by a workload layer of a cloud computing environment, an event associated with extraction and transmission of a dataset from a data center over a network to one or more network servers, wherein a plurality of user devices interface with the one or more network servers, and the one or more network servers interface with one or more servers of the data center;
    identifying, by the workload layer of the cloud computing environment, a plurality of tasks associated with a plurality of users and the event;
    creating a virtual location identifier associated with the event and a plurality of event attributes;
    linking the virtual location identifier to a resource manager of the data center;
    linking the virtual location identifier to user profile data of the users;
    determining a probability and a predicted timing of the users making a post to the one or more network servers based on the user profile data and the event attributes;
    increasing, by the workload layer of the cloud computing environment, a priority of data extraction from a backend data storage system of the data center through the resource manager for a first topic associated with the event;
    decreasing, by the workload layer of the cloud computing environment, the priority of data extraction from the backend data storage system of the data center through the resource manager for a second topic unassociated with the event;
    determining, by the workload layer of the cloud computing environment, a predicted availability time of the dataset for the one or more network servers based on data extraction performance from the backend data storage system of the data center and the priority using information provided by the resource manager;
    sending a posting delay request based on predicting that at least one of the users will make the post prior to the predicted availability time of the dataset;
    sending a posting suggestion based on predicting that at least one of the users will make the post after the predicted availability time of the dataset;
    clustering processing, by the workload layer of the cloud computing environment, of a plurality of posting requests of two or more of the users through the one or more network servers to align with the predicted availability time of the dataset; and
    coordinating augmentation, by the workload layer of the cloud computing environment, of two or more postings associated with the plurality of posting requests using a cognitive system to incorporate one or more additional features based on the dataset.

2. The computer-implemented method of claim 1, further comprising:
    providing the dataset to the cognitive system to augment the two or more postings associated with the plurality of posting requests to incorporate the one or more additional features based on the dataset.

3. The computer-implemented method of claim 1, further comprising:
    aggregating two or more of the tasks based on one or more of: a data type, a size, and a time proximity.

4. The computer-implemented method of claim 3, wherein aggregating further comprises searching for one or more other tasks predicted to have a same outcome as the aforementioned tasks and searching for one or more tasks predicted to produce results that will aggregate with a current task prior to processing the current task.

5. The computer-implemented method of claim 1, further comprising:
    inferring a type of data processing for prioritizing the tasks based on a simulator operable to perform a queuing model; and
    allocating one or more resources of the data center based on the type of data processing.

6. A system comprising:
    a backend data storage system of a data center; and
    at least one processing device of a cloud computing environment configured to perform a method, the method comprising:
        identifying, by a workload layer of the cloud computing environment, an event associated with extraction and transmission of a dataset from the data center over a network to one or more network servers, wherein a plurality of user devices interface with the one or more network servers, and the one or more network servers interface with one or more servers of the data center;
        identifying, by the workload layer of the cloud computing environment, a plurality of tasks associated with a plurality of users and the event;
        creating a virtual location identifier associated with the event and a plurality of event attributes;
        linking the virtual location identifier to a resource manager of the data center;
        linking the virtual location identifier to user profile data of the users;
        determining a probability and a predicted timing of the users making a post to the one or more network servers based on the user profile data and the event attributes;
        increasing, by the workload layer of the cloud computing environment, a priority of data extraction from a backend data storage system of the data center through the resource manager for a first topic associated with the event;
        decreasing, by the workload layer of the cloud computing environment, the priority of data extraction from the backend data storage system of the data center through the resource manager for a second topic unassociated with the event;
        determining, by the workload layer of the cloud computing environment, a predicted availability time of the dataset for the one or more network servers based on data extraction performance from a backend data storage of the data center and the priority using information provided by the resource manager;
        sending a posting delay request based on predicting that at least one of the users will make the post prior to the predicted availability time of the dataset;
        sending a posting suggestion based on predicting that at least one of the users will make the post after the predicted availability time of the dataset;

clustering processing, by the workload layer of the cloud computing environment, of a plurality of posting requests of two or more of the users through the one or more network servers to align with the predicted availability time of the dataset; and coordinating augmentation, by the workload layer of the cloud computing environment, of two or more postings associated with the plurality of posting requests using a cognitive system to incorporate one or more additional features based on the dataset.

7. The system of claim 6, wherein the at least one processing device is configured to perform:

providing the dataset to the cognitive system to augment the two or more postings associated with the plurality of posting requests to incorporate the one or more additional features based on the dataset.

8. The system of claim 6, wherein the at least one processing device is configured to perform:

aggregating two or more of the tasks based on one or more of: a data type, a size, and a time proximity.

9. The system of claim 8, wherein aggregating further comprises searching for one or more other tasks predicted to have a same outcome as the aforementioned tasks and searching for one or more tasks predicted to produce results that will aggregate with a current task prior to processing the current task.

10. The system of claim 6, wherein the at least one processing device is configured to perform:

inferring a type of data processing for prioritizing the tasks based on a simulator operable to perform a queuing model; and allocating one or more resources of the data center based on the type of data processing.

11. A computer program product comprising:

a non-transitory computer readable storage medium having program instructions embodied therewith, the program instructions executable by a processing device of a cloud computing environment to cause the processing device to perform a method comprising:

identifying, by a workload layer of the cloud computing environment, an event associated with extraction and transmission of a dataset from a data center over a network to one or more network servers, wherein a plurality of user devices interface with the one or more network servers, and the one or more network servers interface with one or more servers of the data center;

identifying, by the workload layer of the cloud computing environment, a plurality of tasks associated with a plurality of users and the event;

creating a virtual location identifier associated with the event and a plurality of event attributes;

linking the virtual location identifier to a resource manager of the data center;

linking the virtual location identifier to user profile data of the users;

determining a probability and a predicted timing of the users making a post to the one or more network servers based on the user profile data and the event attributes;

increasing, by the workload layer of the cloud computing environment, a priority of data extraction from a backend data storage system of the data center through the resource manager for a first topic associated with the event;

decreasing, by the workload layer of the cloud computing environment, the priority of data extraction from the backend data storage system of the data center through the resource manager for a second topic unassociated with the event;

determining, by the workload layer of the cloud computing environment, a predicted availability time of the dataset for the one or more network servers based on data extraction performance from the backend data storage system of the data center and the priority using information provided by the resource manager;

sending a posting delay request based on predicting that at least one of the users will make the post prior to the predicted availability time of the dataset;

sending a posting suggestion based on predicting that at least one of the users will make the post after the predicted availability time of the dataset;

clustering processing, by the workload layer of the cloud computing environment, of a plurality of posting requests of two or more of the users through the one or more network servers to align with the predicted availability time of the dataset; and coordinating augmentation, by the workload layer of the cloud computing environment, of two or more postings associated with the plurality of posting requests using a cognitive system to incorporate one or more additional features based on the dataset.

12. The computer program product of claim 11, wherein the program instructions executable by the processing device further cause the processing device to perform:

providing the dataset to the cognitive system to augment the two or more postings associated with the plurality of posting requests to incorporate the one or more additional features based on the dataset; and aggregating two or more of the tasks based on one or more of: a data type, a size, and a time proximity.

* * * * *